United States Patent [19]

Billings

[11] Patent Number: 4,656,365
[45] Date of Patent: Apr. 7, 1987

[54] SOLID STATE POWER CONTROLLER LEAKAGE CURRENT SHUNT CIRCUIT

[75] Inventor: William W. Billings, Lima, Ohio

[73] Assignee: Westinghouse Electric Corp., Pittsburgh, Pa.

[21] Appl. No.: 755,136

[22] Filed: Jul. 12, 1985

[51] Int. Cl.$^4$ .......................... H01H 3/26; H02H 9/00
[52] U.S. Cl. ......................................... 307/140; 361/56
[58] Field of Search ...................... 307/140, 112, 326; 361/56, 18

[56] References Cited

U.S. PATENT DOCUMENTS 3,873,905  3/1975  Marek ............................. 307/326 X
4,404,473  9/1983  Fox .
4,502,085  2/1985  Morrison et al. ..................... 361/56

FOREIGN PATENT DOCUMENTS 0702449 12/1979 U.S.S.R. ............................. 307/326
1005234  3/1983 U.S.S.R. ............................. 307/326

Primary Examiner—Vit W. Miska
Attorney, Agent, or Firm—R. P. Lenart

[57] ABSTRACT

A solid state power controller including a switching device which has a first impedance in an ON state and a second, higher impedance in an OFF state is provided with a leakage current shunt circuit. The solid state power controller includes a control circuit for turning the switching device on and off. This control circuit is operatively associated with a shunt circuit operating means which turns the shunt circuit on following a transition of the switching device from an ON state to an OFF state and which renders the shunt circuit inoperative prior to a transition of the switching device from an OFF state to an ON state. The shunt circuit thereby acts to clamp the voltage appearing at a pair of solid state power controller load output terminals.

9 Claims, 9 Drawing Figures

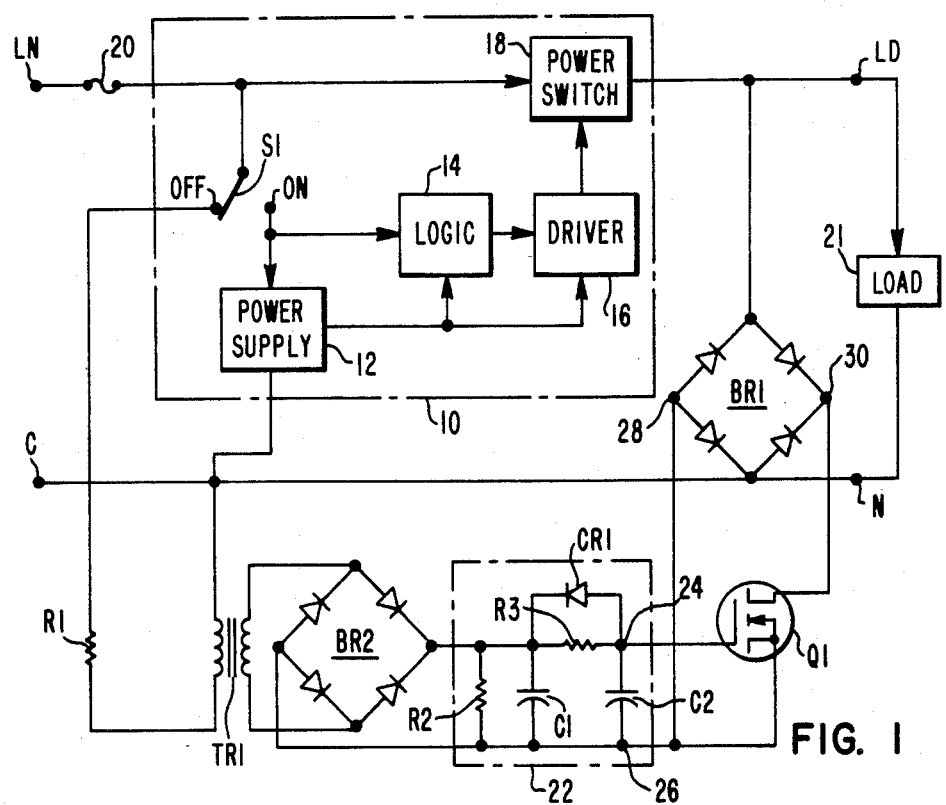
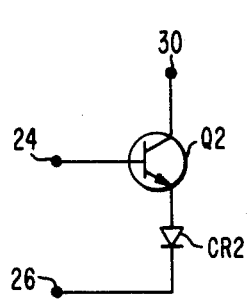
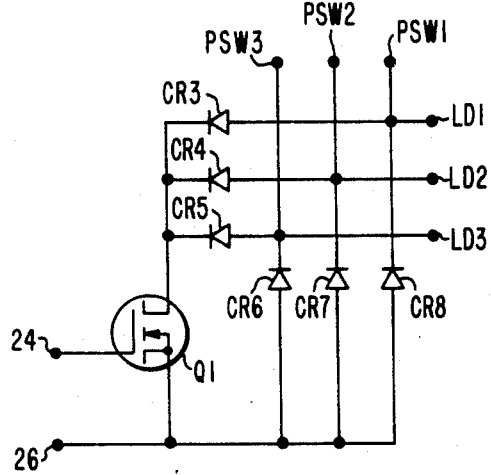
FIG. 1
FIG. 2
FIG. 3

SOLID STATE POWER CONTROLLER LEAKAGE CURRENT SHUNT CIRCUIT

BACKGROUND OF THE INVENTION

This invention relates to control circuits and more particularly to circuits which are used in combination with solid state switching devices.

Solid state switching devices which may be variously referred to as solid state power controllers, solid state circuit breakers or solid state switches, offer many performance features which make them preferable to mechanical switching devices in numerous applications. However, each of these switching devices includes a solid state switch which in the open state does not provide a completely open circuit. Leakage current which passes through the switching device while it is in the off state, can result in a shock hazard for maintenance personnel and consequently limits user acceptability of solid state power control devices. Of special concern is a circuit condition that occurs if a load is disconnected as part of a maintenance effort and the solid state power controller output voltage rises to line potential. The use of snubber circuits across the solid state power switch to meet dv/dt requirements increases open power switch leakage current.

It is therefore desirable that solid state power controllers be provided with means for clamping the off state load voltage to a low level to prevent potential shock hazards and eliminate the possibility of inadvertently delivering high voltage to the load terminals of a controller.

SUMMARY OF THE INVENTION

The present invention uses a shunt circuit connected between the output terminals of a solid state power controller (SSPC) to clamp the off state voltage to a low level by providing a sink for power switch leakage current. This reduces the solid state power controller off state open circuit output voltage from that of the input line voltage down to a value well within established safety limits, thereby eliminating a leakage current shock hazard.

A solid state power control device constructed in accordance with one embodiment of the present invention includes a switching means having a first impedance in the on state and a second, higher impedance in the off state. This switching means is connected between a power input terminal and a first load output terminal and is operatively associated with a control means which turns the switching means on and off. A shunt circuit is electrically connected between the first load terminal and a second load terminal for shunting leakage current from the switching means when the switching means is in its off state. An operating means which is associated with the control means is used to render the shunt circuit operative following a transition of the switching means from an on state to an off state, and for rendering the shunt circuit inoperative prior to a transition of the switching means from an off state to an on state.

In an alternative embodiment, the shunt circuit can be made operative by the presence of a preselected voltage magnitude on the output terminals when the control means indicates, by way of a status signal, that the switching means is in an off state.

The leakage current shunt concept of the present invention is applicable to both AC and DC solid state power controllers, with the shunt circuit being energized whenever the solid state power controller switching device is in its off or tripped state. Careful attention is given to the timing of shunt circuit operation to assure the removal of clamping action before the solid state power controller turns on and to delay the clamping action after turn off of the solid state power controller to assure complete current commutation.

BRIEF DESCRIPTION OF THE DRAWINGS

FIG. 1 is a schematic diagram of a control circuit constructed in accordance with one embodiment of the present invention;

FIG. 2 is a schematic diagram of an alternative shunt transistor for use in the circuit of FIG. 1;

FIG. 3 is a schematic diagram which illustrates the connections used when the circuit of FIG. 1 is applied to a multiphase system;

DESCRIPTION OF THE PREFERRED EMBODIMENTS

Figure 4:
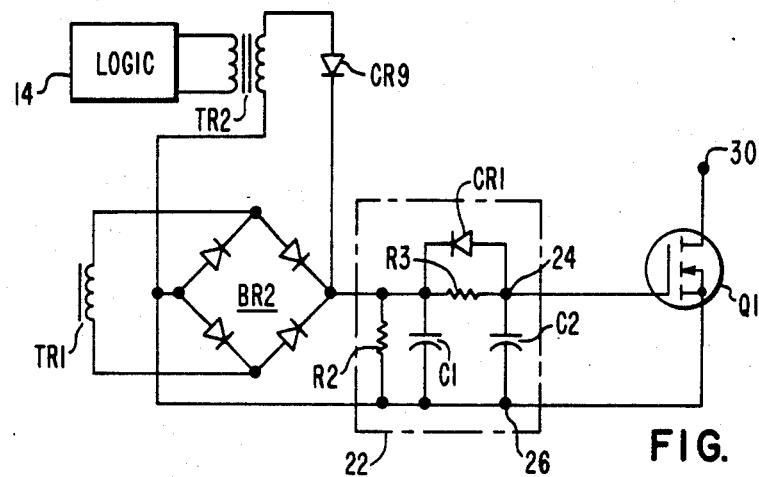
FIGS. 4 and 5 are schematic diagrams of alternative shunt operating circuits.

Referring to the drawings, FIG. 1 is a schematic diagram of a control circuit including a solid state power controller and a shunt leakage current circuit constructed in accordance with one embodiment of the present invention. A solid state power controller (SSPC) 10 includes an internal power supply 12, logic circuit 14, driver circuit 16, and power switching device 18. In general, the power switching device 18 will be solid state devices such as silicon controlled rectifiers or field effect transistors having a first impedance in an on state and a second, higher impedance in an off state. The solid state power controller 10 is connected between a power input terminal LN and a first load terminal LD through a fuse 20. A typical power controller is illustrated in U.S. Pat. No. 4,404,473, issued Sept. 13, 1983 to Fox, the disclosure of which is hereby incorporated by reference.

A switch S1 is used to provide on/off operation of the power controller 10 and also supplies power to a means for producing a control signal which energizes the leakage current shunt circuit of FIG. 1. By switching S1 to the "off" position, line voltage is supplied to dropping resistor R1 and transformer TR1. The transformer secondary voltage is rectified by bridge BR2, filtered and applied to a shaping circuit 22 comprising resistors R2 and R3, capacitors C1 and C2, and diodes CR1. A rectifier bridge BR1 includes four terminals, two of which are connected between load terminals LD and N. A field effect transistor Q1 is connected between the other two terminals of bridge BR1. Shaping circuit 22 provides a delayed gate signal to transistor Q1 to assure that the power switch 18 in solid state power controller 10 has turned off prior to turn on of the leakage current shunt circuit. When switch S1 is shifted to the "on" position, a fast release of the leakage current shunt circuit assures that the power switch 18 does not turn on into a conducting shunt circuit. Control of the timing of shunt circuit operation with respect to the operation of power switch 18 is important to prevent a short circuit across the input power terminals. The rectifiers in bridge BR1 rectify the AC voltage appearing at the solid state power controller output terminals so that the transistor Q1 can be effective during both negative and positive half cycles. FIG. 2 shows an alternative bipolar switching transistor Q2 in series with a diode CR2, which may be substituted for the transistor Q1 in FIG. 1.

The circuit of FIG. 1 will work for both single pole and two pole solid state power controllers which have single element loads. For three pole solid state power controllers, bridge BR1 in FIG. 1 would be replaced by diodes CR3, CR4, CR5, CR6, CR7 and CR8 in a three phase full wave rectifier configuration as shown in FIG. 3. In that Figure, terminals LD1, LD2 and LD3 represent load terminals while terminals PSW1, PSW2 and PSW3 are connected to three power switches of a three phase solid state power controller. Terminals 24 and 26 correspond to the output terminals of shaping circuit 22 in FIG. 1.

FIG. 4 is a schematic diagram of an alternative embodiment of the leakage current shunt circuit of FIG. 1 adapted to provide a path for leakage current when solid state power controller 10 is in the tripped state. This is accomplished by "ORing" a signal obtained by way of transformer TR2 from the logic circuitry 14 in the solid state power controller 10 with the signal previously supplied by transformer TR1 in FIG. 1. A switch status signal illustrating a tripped condition would be generated by the controller logic circuit 14 in accordance with known technology as illustrated in the previously referenced U.S. Pat. No. 4,404,473. It should be apparent that the circuit of FIG. 4 will cause transistor Q1 to be turned on whenever a signal is applied to either transformer TR1 or to transformer TR2.

Figure 5:
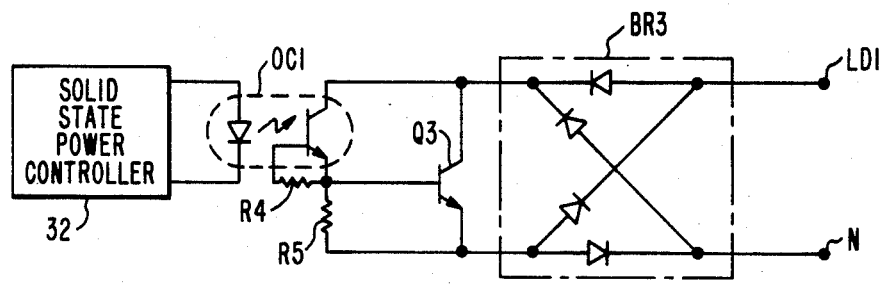

For solid state power controllers that are operated by electrical control signals, the means for operating the leakage current shunt circuit will come from logic signals rather than a control switch as illustrated in FIG. 1. FIG. 5 is a schematic diagram of a circuit which uses an optical coupler OC1 to provide an electrical interface between a completely electronic solid state power controller 32 and a leakage current shunt circuit which comprises bridge BR3 and switching transistor Q3. Since most solid state power controllers obtain internal control power from the input line voltage, the energization of the leakage current shunt circuit is compatible with the presence of solid state power controller line voltage.

Figure 6:
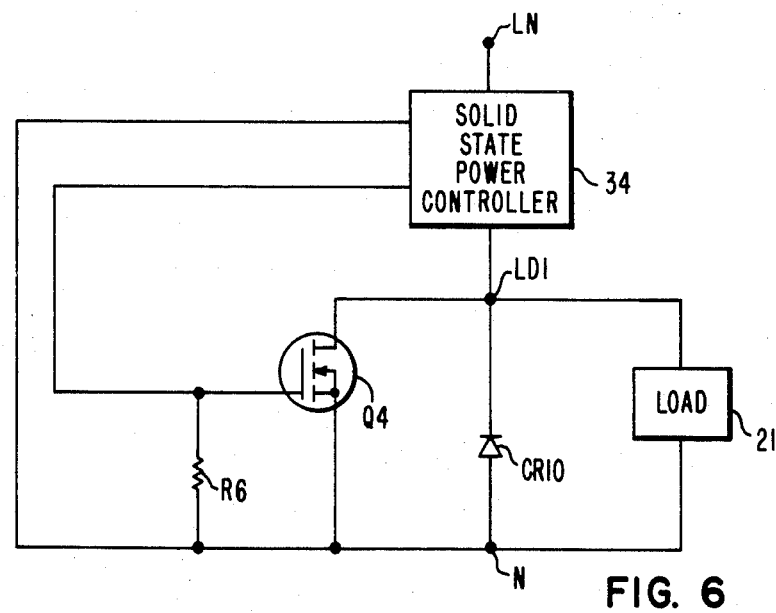
FIG. 6 is a schematic diagram of a circuit constructed in accordance with the present invention for use in a DC application.

FIG. 6 is a schematic diagram of an alternative embodiment of the present invention wherein a leakage current shunt circuit is applied to a DC solid state power controller 34. The leakage current shunt circuit of FIG. 4 comprises transistor Q4 and resistor R6. Gate drive for transistor Q4 is applied in the form of an off or trip signal from solid state power controller 34. A commutating diode CR10 is connected in parallel with transistor Q4. The circuit of FIG. 6 is used for DC solid state power controllers that have an internal control power supply common connected to the power ground. For DC solid state power controllers where the internal control power common is not connected to power ground, the circuit implementation would be the same as that shown in FIG. 5 but without bridge BR3 which is not needed in a DC application.

The discussion to this point has not considered the effect of a shorted power switch in a solid state power controller. In such an event, either the leakage current shunt circuit or the power switch must open as they will be connected directly across the power source. In the circuit of FIG. 1, a fuse 20 has been included in series with the power switch 18 to protect circuit wiring. This fuse will also help to prevent failure of the shunt circuit components in the event of a short in power switch 18.

Figure 7:
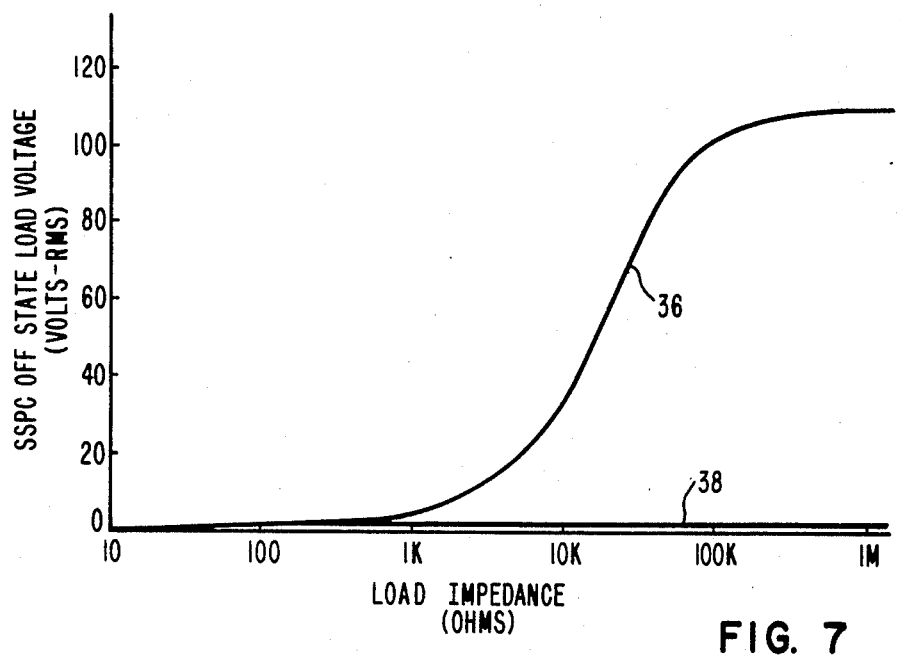
FIGS. 7 and 8 are curves illustrating the performance characteristics of the circuit of FIG. 1.

Several circuits have been fabricated and tested in accordance with this invention. FIG. 7 shows the output voltage characteristic as a function of load impedance for one of the tested circuits. Curve 36 represents the output voltage with the leakage current shunt circuit disabled. Curve 38 represents the output voltage with the leakage current shunt circuit enabled.

Figure 8:
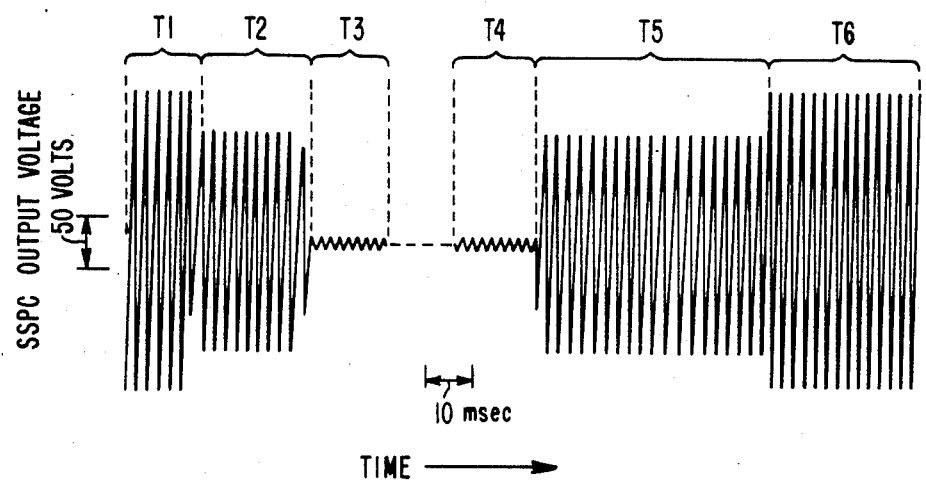

FIG. 8 shows the solid state power controller output voltage waveform of one of the tested circuits at turn off and turn on to illustrate the various modes of operation. In time interval T1 the SSPC is turning off. In time interval T2, the SSPC has turned off and the leakage current shunt circuit is non-conductive. In time interval T3, the SSPC is off and the leakage current shunt circuit is operative. During time interval T4 the SSPC is turning on and the leakage current shunt circuit is still conductive. In time interval T5, the SSPC is still turning on and the leakage current shunt circuit is non-conductive. In time interval T6 the SSPC is on and the leakage current shunt circuit remains off.

Figure 9:
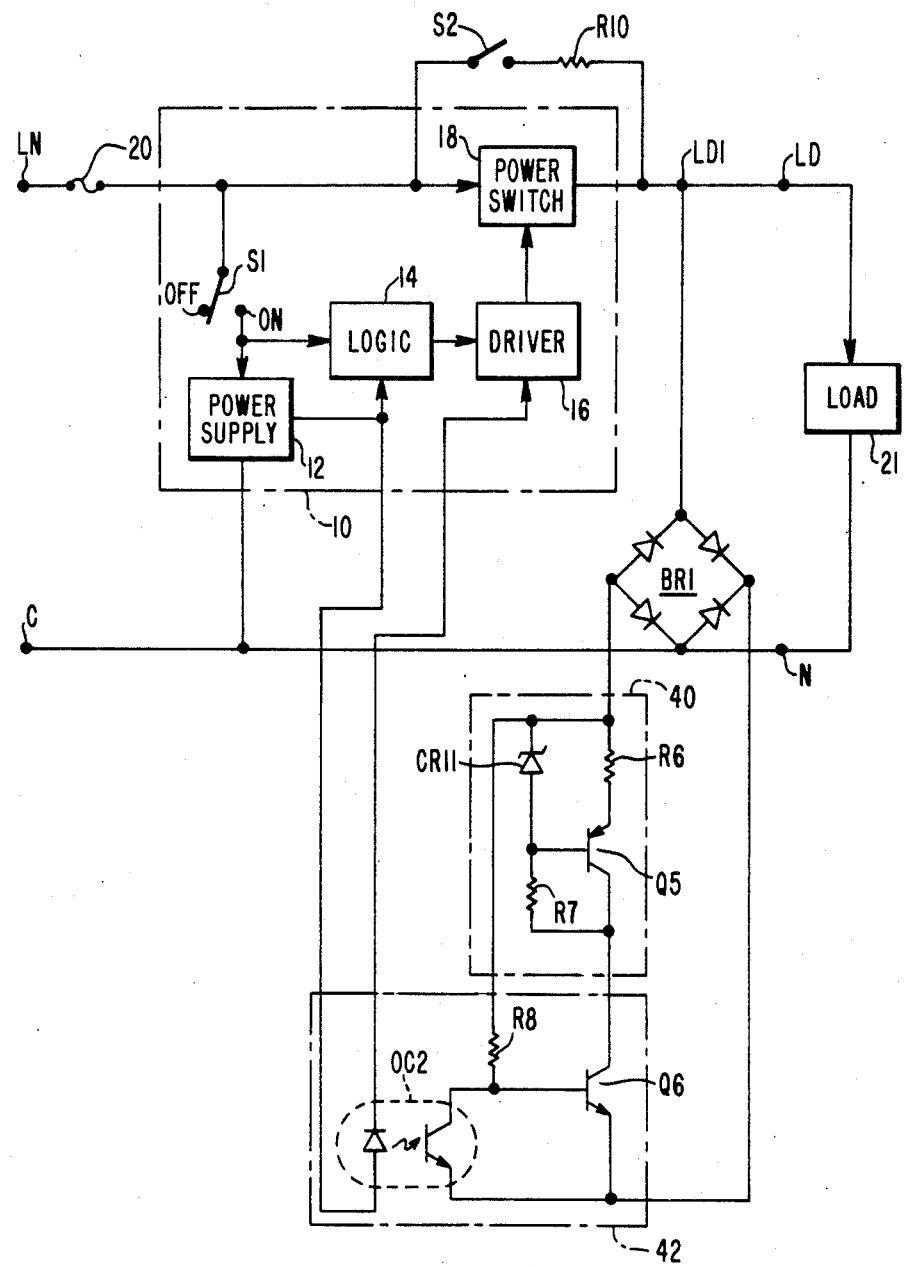
FIG. 9 is a schematic diagram of another alternative embodiment of the present invention.

FIG. 9 is a schematic diagram of another alternative embodiment of the present invention. In this embodiment, the leakage current shunt circuit includes the series connection of a current limiting circuit 40 and an inhibiting circuit 42. The current limiting circuit comprises resistors R6 and R7, diodes CR11 and transistor Q5. The inhibiting circuit comprises optical coupler OC2, resistor R8 and transistor Q6. With the component connections as shown in FIG. 9, the leakage current shunt circuit is self-energized by the presence of a load voltage between terminals LD1 and N and is disabled when optical coupler OC2 receives an ON status signal from the drive circuit 16 of solid state power controller 10. The current limiting circuit 40 provides a self-protection feature which permits the leakage current shunt circuit to withstand full load voltage when it is in the conducting mode. This configuration will cover conditions wherein the power switch 18 is inadvertently turned on by a circuit transient or when a second solid state power controller, as symbolically illustrated by the series connection of switch S2 and resistor R10, is electrically connected in parallel with SSPC 10 to provide a transfer breaker function. This situation may occur when two power sources supply one load through two SSPC's wherein one SSPC is always on and the other SSPC is always off. This type of operation results in the off SSPC seeing a load voltage in its off state.

In the circuit of FIG. 9, when S1 and S2 are open, Q5 and Q6 conduct and limit the load voltage to a low value of, for example, 5 volts with the load 21 open circuited. This corresponds to a leakage current of, for example, 3 milliamps. If a second SSPC, which is connected in parallel with SSPC 10, turns on as illustrated by the closure of switch S2 in FIG. 9, the current in the leakage current shunt circuit would increase to, a somewhat higher value of, for example, 11 milliamps. When SSPC 10 is turned on by turning switch S1 to the on position, current to the drive circuit 16 energizes optical coupler OC2, thereby removing the base drive to Q6 and deenergizing the shunt circuit. The circuit of FIG. 9 has the further advantage that it will function without modification to divert leakage current when SSPC has been tripped.

The circuits of the present invention provide voltage limiting when the SSPC is off due to an open control switch, the absence of a control input signal, or the occurrence of a tripped condition. The shunt circuit of FIG. 9 includes inherent protection if the SSPC is leaky in the off or tripped state; if it inadvertently turns on due to a line voltage transient; or if line voltage is connected to the load terminals as might occur during testing or when SSPC's are connected in parallel.

In order to provide a more complete description of the present invention, Table I includes a list of components which may be used to construct the circuits shown in the Figures.

TABLE I

| ITEM | Type/Value |
|---|---|
| Q1 | Ferranti ZVN0545B |
| Q2 | Motorola MPSA42 |
| Q3 | Motorola MJ4647 |
| Q4 | Ferranti ZVN0545B |
| Q5 | 2N6212 |
| Q6 | Motorola MPSA42 |
| CR1, CR2, CR9 | 1N4148 |
| CR3, CR4, CR5, CR6, CR7, CR8 | 1N649 |
| CR11 | 1N746 |
| OC1 | Motorola MOC8204 |
| OC2 | 4N23 |
| R1 | 30K |
| R2 | 2K |
| R3 | 10K |
| R4 | 2 M |
| R5 | 20K |
| R6 | 180 |
| R7 | 24K |
| R8 | 51K |
| C1 | 2.2 μfd, 20 v |
| C2 | 2.2 μfd, 20 v |
| BR1 | 4 × 1N649 |
| BR2 | VE 18 X |
| BR3 | 4 × 1N649 |
| TR1 | TRW DIT - 25 |
| TR2 | 100 turns:100 turns, No. 38 wire on a .3 in. × .125 in. × .19 in. torroidal ferrite core |

For the circuit of FIG. 1, the component values shown are designed to provide 20 millisecond and 2 millisecond circuit turn on and turn off time constants respectively for the gate signal to transistor Q1. The type of diode used for item No. CR10 in FIG. 6 will be determined for each application in accordance with known engineering practice.

Although the present invention has been described in terms of what are at present believed to be its preferred embodiments, it will be apparent to those skilled in the art that various changes may be made without departing from the scope of the invention. It is therefore intended that the appended claims cover such changes.

What is claimed is:

1. A control circuit comprising:
   switching means having a first impedance in an ON state and a second impedance in an OFF state, wherein said second impedance is higher than said first impedance;
   control means for turning said switching means on or off;
   means for connecting said switching means electrically in series between a power input terminal and a first load output terminal;
   a shunt circuit electrically connected between said first load output terminal and a second load terminal, for shunting leakage current from said switching means when said switching means is in said OFF state; and
   operating means associated with said control means for rendering said shunt circuit operative in response to a control signal following a transition of said switching means from an ON state to an OFF state, and for rendering said shunt circuit inoperative in response to said control signal prior to a transition of said switching means from an OFF state to an ON state.

2. A control circuit as recited in claim 1, wherein said operating means also renders said shunt circuit operative in response to a trip signal from said control means.

3. A control circuit as recited in claim 1, wherein said operating means comprises:
   a power supply, connectable to receive power from said power input terminal; and a delay circuit for delaying the application of voltage to said shunt circuit from said power supply.

4. A control circuit as recited in claim 3, wherein said shunt circuit comprises:
   a full wave rectifier bridge having four terminals, with a first two of said bridge terminals being connected to said first and second load terminals; and
   a transistor switch electrically connected between a second two of said bridge terminals.

5. A control circuit as recited in claim 1, further comprising:
   a fuse electrically connected in series between said power input terminal and said switching means.

6. A control circuit as recited in claim 1, further comprising:
   a reverse biased diode connected electrically in parallel with said shunt circuit; and
   wherein said shunt circuit comprises a transistor switch.

7. A control circuit comprising:
   switching means having a first impedance in an ON state and a second impedance in an OFF state, wherein said second impedance is higher than said first impedance;
   control means for turning said switching means on or off and for producing a switching means status signal;
   means for connecting said switching means electrically in series between a power input terminal and a first load output terminal;
   a shunt circuit electrically connected between said first load output terminal and a second load terminal, for shunting leakage current from said switching means when said switching means is in said OFF state, wherein said shunt circuit includes the series connection of a current limiting circuit and an inhibiting circuit; and
   operating means associated with said control means for rendering said shunt circuit operative when the voltage between said first and second load terminals reaches a preselected magnitude and when said status signal indicates that said switching means is in the OFF state.

8. A control circuit as recited in claim 8, wherein said shunt circuit further comprises:

a full wave rectifier bridge having four terminals, with a first two of said bridge terminals being connected to said first and second load terminals; and said series connection of said current limiting circuit and said inhibiting circuit being electrically connected between a second two of said bridge terminals.

9. A control circuit as recited in claim 7, further comprising:
a reverse biased diode connected electrically in parallel with said shunt circuit.

* * * * *